United States Patent
Zhang et al.

(10) Patent No.: US 12,374,681 B2
(45) Date of Patent: Jul. 29, 2025

(54) METHODS FOR PRELITHIATING ELECTRODES USING LITHIUM SILICON ALLOYS

(71) Applicant: Albemarle Coporation, Charlotte, NC (US)

(72) Inventors: Yinzhi Zhang, Charlotte, NC (US); Kristina L. Butler, Gastonia, NC (US); Jeffrey McCall, Kings Mountain, NC (US)

(73) Assignee: ALBEMARLE CORPORATION, Charlotte, NC (US)

( * ) Notice: Subject to any disclaimer, the term of this patent is extended or adjusted under 35 U.S.C. 154(b) by 112 days.

(21) Appl. No.: 16/642,207

(22) PCT Filed: Aug. 31, 2018

(86) PCT No.: PCT/US2018/049096
§ 371 (c)(1),
(2) Date: Feb. 26, 2020

(87) PCT Pub. No.: WO2019/046720
PCT Pub. Date: Mar. 7, 2019

(65) Prior Publication Data
US 2020/0335771 A1 Oct. 22, 2020

Related U.S. Application Data

(60) Provisional application No. 62/552,834, filed on Aug. 31, 2017.

(51) Int. Cl.
*H01M 4/1395* (2010.01)
*H01M 4/134* (2010.01)
(Continued)

(52) U.S. Cl.
CPC ......... *H01M 4/1395* (2013.01); *H01M 4/134* (2013.01); *H01M 4/1393* (2013.01);
(Continued)

(58) Field of Classification Search
None
See application file for complete search history.

(56) References Cited

U.S. PATENT DOCUMENTS

| | | | |
|---|---|---|---|
| 2005/0214644 A1* | 9/2005 | Aramata | H01M 4/133 252/502 |
| 2010/0120179 A1* | 5/2010 | Zhamu | H01M 4/625 257/E21.001 |

(Continued)

FOREIGN PATENT DOCUMENTS

| | | |
|---|---|---|
| CN | 102642024 A | 8/2012 |
| CN | 104916814 A | 9/2015 |

(Continued)

OTHER PUBLICATIONS

Dunmore internet website (https://www.dunmore.com/products/battery.html) (Year: 2016).*
American Laboratory (website) (Year: 2015).*

*Primary Examiner* — Yoshitoshi Takeuchi
(74) *Attorney, Agent, or Firm* — KDW Firm PLLC

(57) ABSTRACT

Methods are provided for prelithiating an electrode by contacting the electrode with a plurality of particles of one or more $Li_xSi_y$ alloys having specified lithium content and particle sizes.

11 Claims, 4 Drawing Sheets

(51) Int. Cl.
   *H01M 4/1393* (2010.01)
   *H01M 4/38* (2006.01)
   *H01M 4/40* (2006.01)
   *H01M 4/587* (2010.01)
   *H01M 10/0525* (2010.01)

(52) U.S. Cl.
   CPC ........... *H01M 4/386* (2013.01); *H01M 4/405* (2013.01); *H01M 4/587* (2013.01); *H01M 10/0525* (2013.01)

(56) References Cited

U.S. PATENT DOCUMENTS

| | | | | |
|---|---|---|---|---|
| 2010/0173198 | A1* | 7/2010 | Zhamu | H01M 4/38 429/231.95 |
| 2011/0123866 | A1* | 5/2011 | Pan | H01M 4/525 427/458 |
| 2013/0216907 | A1* | 8/2013 | Rayner | B22F 1/06 241/24.1 |
| 2014/0287327 | A1* | 9/2014 | Lee | H01M 4/587 429/251 |
| 2016/0093884 | A1* | 3/2016 | Cui | H01M 4/38 252/519.1 |
| 2016/0126543 | A1* | 5/2016 | Ota | H01M 4/587 |
| 2016/0149206 | A1* | 5/2016 | Liu | H01M 4/485 252/182.1 |
| 2017/0179482 | A1* | 6/2017 | Verbrugge | H01M 10/446 |
| 2018/0138494 | A1* | 5/2018 | Birt | H01M 4/382 |
| 2018/0212234 | A1* | 7/2018 | Haufe | H01M 4/622 |
| 2019/0214642 | A1* | 7/2019 | Newbound | H01M 4/0471 |

FOREIGN PATENT DOCUMENTS

| | | |
|---|---|---|
| DE | 10 2015 215 415 A1 | 2/2017 |
| KR | 10-2017-0020850 | 2/2017 |
| WO | 2015/192051 | 12/2015 |
| WO | 2016/048850 A1 | 3/2016 |
| WO | 2017/123443 | 7/2017 |

\* cited by examiner

METHODS FOR PRELITHIATING ELECTRODES USING LITHIUM SILICON ALLOYS

REFERENCE TO RELATED APPLICATIONS

This application is the National Stage of International Patent Appl. No. PCT/US2018/049096 filed on Aug. 31, 2018, which in turn claims the benefit of U.S. Provisional Patent Appl. No. 62/552,834, filed on Aug. 31, 2017, the disclosure of which is incorporated herein by reference.

BACKGROUND

Lithium-ion batteries are used in a wide variety of consumer electronics and are increasingly being adopted in electric vehicles. Researchers and developers are focused on improving the performance of lithium-ion batteries for such applications. In this regard, anode materials such as graphite, silicon, silicon oxide(s), and graphite with silicon and/or silicon oxide(s) are being used/tested. One issue of concern with such anode materials is loss of lithium during cycling. Of particular concern is the first cycle lithium loss because lithium losses are typically large at the first cycle.

Prelithiation of anode materials can help to compensate for lithium loss in lithium-ion batteries. To the best knowledge of the current inventor, fine lithium metal powder is the most commonly used commercially available prelithiation additive. However, there are several challenges with using lithium metal powder to prelithiate an anode, which impede its application. For example, the intrinsic lightness of lithium metal powder and the electrostatic forces between particles make it easy to become air-borne and pose huge challenges for safe handling and precise application and dosing; and the high reactivity of lithium metal makes it hard to adapt into a commercial battery production line.

Attempts have been made to address these challenges. For example, Zhao et al. state in "Artificial Solid Electrolyte Interphase-Protected LixSiy Nanoparticles: An Efficient and Stable Prelithiation Reagent for Lithium-Ion Batteries": "We recently demonstrated that LixSiy nanoparticles (NPs) synthesized by thermal alloying can serve as a high-capacity prelithiation reagent, although their chemical stability in the battery processing environment remained to be improved." Zhao et al. further state that "Currently, the only commercial prelithiation reagent in powder form is microscale stabilized lithium metal powder (SLMP) (FMC Lithium Corp.), which effectively compensates for the first-cycle irreversible capacity loss of different anode materials, such as SiO and Si—CNT composites. However, it is difficult to synthesize SLMP in research laboratories, and other practical challenges still remain to be addressed." See *J. Am. Chem. Soc.*, 2015, 137 (26), pp 8372-8375. In this same publication, Zhao et al. propose "a surface modification method to enhance the stability of LixSiy nanoparticles by exploiting the reduction of 1-fluorodecane on the LixSiy surface to form a continuous and dense coating . . . ." However, applying such a surface treatment technology would be costly and tedious to carry out in a commercial production environment. Further, the dense coating may lower the performance of the Li-containing particles.

Thus, there is a need for new and improved methods for prelithiating anodes such as silicon-based anodes, particularly such methods that will effectively deter irreversible loss of lithium during the first charging/discharging cycle.

THE INVENTION

The inventions described herein meet the above-described needs by providing methods for prelithiating an electrode, said methods comprising contacting the electrode with a plurality of particles of one or more LixSiy alloys, wherein at least about 95 vol % of the particles range in size from about 1 micrometer to about 200 micrometers, and each of the LixSiy alloys comprises lithium having a content in the range of about 10 wt % to about 90 wt %. Further provided are such methods, wherein at least one of the LixSiy alloys has a lithium content in the range of about 10 wt % to about 70 wt %, or in the range of about 15 wt % to about 60 wt %, or in the range of about 40 wt % to about 50 wt %. Further provided are such methods, wherein two or more of the particles range in size from about 1 micrometer to about 150 micrometers, or from about 1 micrometer to about 70 micrometers, or from about 1 micrometer to about 50 micrometers. Further provided are such methods, wherein at least one of the LixSiy alloys has been contacted with an organic substance. Further provided are such methods, wherein at least one of the LixSiy alloy has been contacted with an inorganic substance. Further provided are such methods, wherein the electrode is a graphite-based electrode or a silicon-based electrode. Further provided are such methods, wherein prelithiating of the electrode is conducted substantially in the absence of a solvent. Further provided are such methods, wherein prelithiating of the electrode is conducted in the presence of a solvent. Further provided are such methods, wherein prelithiating of the electrode is conducted on a surface of the electrode. Further provided are an electrode prelithiated according to the methods of this invention, and a battery comprising such an electrode, and such a battery wherein the electrode is an anode, and such a battery wherein the anode is adapted to release a greater amount of lithium when the battery undergoes a first charge/discharge cycle than the anode would have released had it not been prelithiated according to the methods of this invention.

Additionally, the inventions described herein provide an electrode prelithiated according to the methods described herein; and also provide a battery comprising such an electrode, which electrode may be either an anode or a cathode. In particular a battery comprising an anode and a cathode is provided, said anode having been prelithiated according to the methods of this invention and being adapted to receive and store lithium released from the cathode, and to release more lithium during a first charge/discharge cycle than the anode would have released had it not been prelithiated according to the methods of this invention, during the first charge/discharge cycle. Under certain conditions, as may be determined by those skilled in the art given the teachings of this application, anywhere from at least a portion to substantially all of the lithium from the prelithiated anode may be released when the battery undergoes a first charge/discharge cycle. The amount of lithium released from the prelithiated anode depends on operating and processing conditions, and on the condition of the lithium in the LixSiy alloy(s) used during prelithiation, e.g., whether such lithium is active or inactive, as will be familiar to those skilled in the art. Given the teachings of this specification, those skilled in the art may prepare a prelithiated anode that is adapted to release more lithium during a first charge/discharge cycle than the anode would have released had it not been prelithiated according to the methods of this invention.

A variety of LixSiy alloys are known to have been used in anode materials of lithium batteries. However, as an active material, the capacity of LixSiy fades quickly with cycling. In "Li-Rich Li—Si Alloy As A Lithium-Containing Negative Electrode Material Towards High Energy Lithium- Ion Batteries", by Iwamura et al., the following is stated: "Shigematsu's group has reported the first delithiation and lithiation capacities of Li21Si5 as 650 and 300 mAh g$^{-1}$-Li21Si5, and it quickly faded down to 37 mAh g$^{-1}$-Li21Si5 at the 4th cycle."

The current inventor found that the micrometer-sized LixSiy molecules/particles are highly stable in the dry room, and even in NMP (N-Methyl-2-pyrrolidone), a commonly used solvent in the lithium ion battery industry. Further, it was found that such molecules/particles are fairly stable in humid air, more so than was expected. And such micrometer-sized LixSiy molecules/particles showed unexpectedly high prelithiation efficiency. All as is illustrated by the following discussion.

FIGURES

The invention will be better understood by reference to the Figures in which.

DETAILED DESCRIPTION

Figure 1:
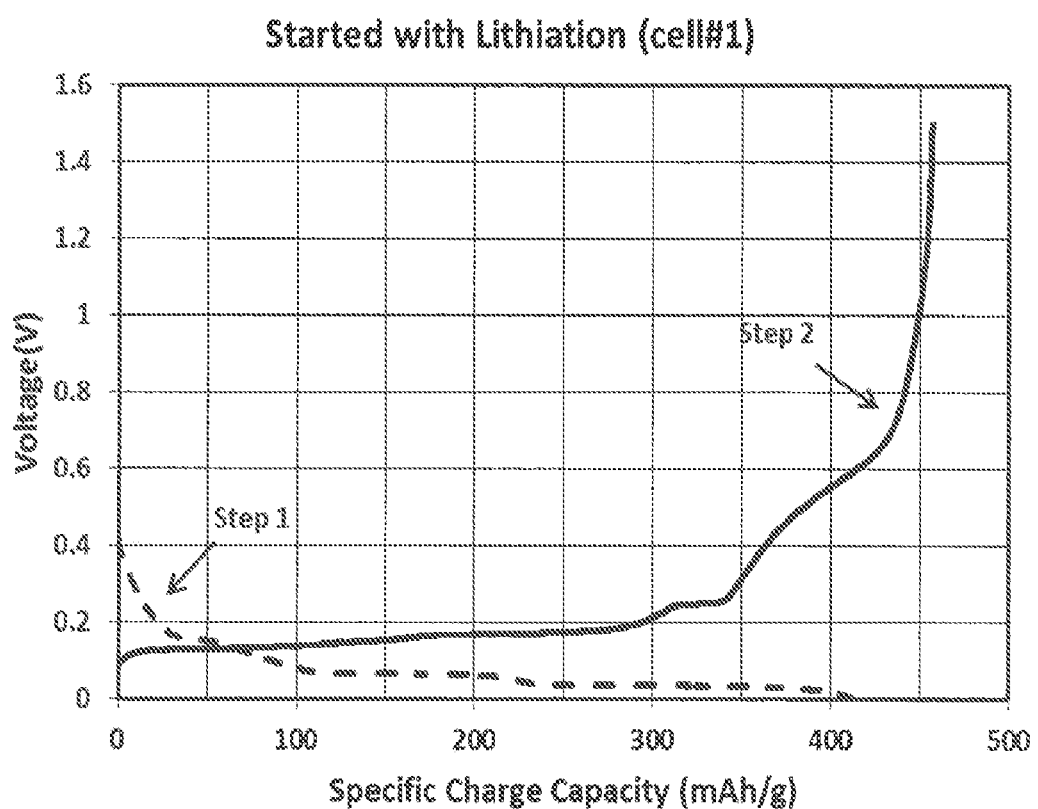
FIG. 1 illustrates the first cycle capacity of a coin cell identified as cell #1, which was prelithiated according to this invention.

In certain aspects of the inventions described herein, at least one of the LixSiy alloys has a lithium content in the range of about 10 wt % to about 90 wt %. In certain aspects of the inventions described herein, at least one of the LixSiy alloys has a lithium content in the range of about 10 wt % to about 70 wt %. In certain aspects of the inventions described herein, at least one of the LixSiy alloys has a lithium content in the range of about 15 wt % to about 60 wt %. In certain aspects of the inventions described herein, at least one of the LixSiy alloys has a lithium content in the range of about 40 wt % to about 50 wt %. For purposes of example only, without limiting this invention, there is a known LixSiy alloy having a lithium content of 19.8 wt %, and a known LixSiy alloy having a lithium content of 50.9 wt %, either of which alloy lithium contents would be suitable for use in methods of this invention.

In certain aspects of the inventions described herein, at least about 95 vol % of the plurality of particles range in size from about 1 micrometer to about 200 micrometers. In other aspects, at least about 97 vol %, or at least about 99 vol %, or about 100 vol % of the plurality of particles range in size from about 1 micrometer to about 200 micrometers. In certain aspects of the inventions described herein, two or more of the particles range in size from about 1 micrometer to about 50 micrometers.

In certain aspects of the inventions described herein, at least one of the LixSiy alloys is coated. In certain aspects of the inventions described herein, at least one of the LixSiy alloys is coated with an organic substance. In certain aspects of the inventions described herein, at least one of the LixSiy alloys is coated with an inorganic substance.

The terms "coated" and "surface-treated" as used herein have the same meaning, i.e., that the coated or surface-treated LixSiy alloy has been or was contacted with the substance with which the alloy is coated or surface-treated, and, optionally, subsequently subjected to a treatment, such as a heat treatment. Referring to Example 11, a LixSiy alloy is coated (surface-treated) with an organic substance. Referring to Example 12, a LixSiy alloy is coated (surface-treated) with an organic substance.

In certain aspects of the inventions described herein, prelithiating of an electrode with the LixSiy alloys described herein is conducted in the presence of a solvent. Suitable solvents, including NMP, are known to those skilled in the art. In other aspects of the inventions described herein prelithiating of an electrode is conducted substantially in the absence of a solvent. As used herein, "substantially in the absence of a solvent" is meant to indicate that no solvent is purposely introduced into the prelithiation process. In certain aspects of the inventions described herein, the electrode is graphite-based or silicon-based. In certain aspects of the inventions described herein, prelithiating of the electrode is conducted on at least a portion of at least one surface of the electrode. In certain aspects of the inventions described herein, prelithiating of the electrode is conducted by combining one or more of the LixSiy alloys described herein with one or more conductive additives to form a combination, and contacting at least a portion of the electrode with the combination. Suitable conductive additives will be known to those skilled in the art, and include, without limitation, carbon black. In certain aspects of the inventions described herein, prelithiating of the electrode is conducted by combining one or more of the LixSiy alloys with conductive additives, binders, and, optionally, other suitable additives, as will be familiar to those skilled in the art, to form a combination, and contacting at least a portion of the electrode with the combination. In certain aspects of the inventions described herein, prelithiating of the anode is conducted by blending one or more of the LixSiy alloys with various additives, anode active materials, and solvent, then coating onto a current collector to make into an electrode. And the solvent can be any solvent compatible with the coated or uncoated Li$_x$Si$_y$ alloys, which includes NMP.

As will be familiar to those of skill in the art, typically an electrode comprises a portion or layer known as the "current collector" and a portion or layer that comprises graphite, silicon, silicon oxide(s), or graphite with silicon and/or silicon oxide(s). For an anode, the current collector typically comprises copper. For a cathode, the current collector typically comprises aluminum. In certain aspects of the inventions described herein, prelithiating of an electrode is conducted by contacting the one or more LixSiy alloys with one or more suitable substances comprising an additive, an active substance, or a solvent, then contacting a current collector with the one or more LixSiy alloys. Said current collector is then combined with a portion or layer that comprises graphite, silicon, silicon oxide(s), or graphite with silicon and/or silicon oxide(s) to form an electrode. The solvent can be any solvent suitable for use with the LixSiy alloys, e.g., NMP.

Various LixSiy alloys suitable for use in the inventions described herein can be produced thermochemically or electrochemically. Depending on the reaction parameters, Li21Si5, Li4.7Si2, Li12Si7, and other such LixSiy alloys, having varied lithium content, can be formed. Also, these LixSiy alloys can be ground and sieved, so that the resultant LixSiy alloy powder with certain desired particle sizes can be collected. These types of LixSiy alloys are commercially available from companies such as Albemarle Corporation.

An electrode can be lithiated/prelithiated with LixSiy alloy particles according to the inventions described herein by any suitable method, as will be familiar to those of skill in the art, including those conducted in the presence of a solvent, and those conducted substantially in the absence of a solvent. Herein, the terms "lithiated" and "prelithiated" are to be used interchangeably. Part to substantially all of the lithium from such a prelithiated electrode will be released during the first charge/discharge cycle of the battery containing the anode. The amount of lithium released depends on operating and processing conditions, and on the condition of the lithium in the LixSiy alloy used for prelithiation, e.g., whether such lithium is active or inactive, all of which will be familiar to those skilled in the art. This release of lithium will be in an amount adequate to compensate for part to all of the intrinsic first cycle loss of lithium, which is mainly into the graphite or silicon anode. For example, the release of lithium from such a prelithiated anode will be in an amount that is greater than the release of the same anode had it not been prelithiated according to methods of this invention. As illustrated by the Examples and related Figures, the first cycle loss can be substantially completely compensated by the lithiation/prelithiation methods of this invention.

Prelithiating methods as described herein are suitable for any electrode, as will be familiar to those skilled in the art, and are particularly well-suited for graphite-based electrodes and silicon-based electrodes. Any such electrode may already contain some lithium. Prelithiating methods as described herein are suitable for any anode and/or any cathode.

EXAMPLES

The following examples are illustrative of the principles of this invention. It is understood that this invention is not limited to any one specific embodiment exemplified herein, whether in the examples or the remainder of this patent application.

Example 1

A lithium silicon alloy having a Li content of 44 wt % was ground by a rotor mill and sieved with US Standard sieves; and the powder between 80 mesh and 200 mesh was collected. The nominal sieve opening for 80 mesh sieve and 200 mesh sieve is 177 microns and 74 microns, respectively. About 1 gram of the resultant powder was transferred into a weighing bottle in a glove box filled with argon. Then the sealed weighing bottle was transferred to a dry room having a dew point of −40° C. The sample was exposed to the dry room air and the weight change of the sample with time was recorded, any weight gain is an indication of lithium reaction. There was negligible weight change (0.05%) after the first 6 hours. We further measured a negligible weight change (−0.1%) even after one day (24 hours).

Example 2 (Comparative Example)

About 1 gram of a commercially available lithium powder, with lithium content>99% and particle size of about 50 micrometers was transferred into a weighing bottle in a glove box filled with argon. Then the sealed weighing bottle was transferred to a dry room having a dew point of −40° C. The sample was exposed to the dry room air and the weight change of the sample with time was recorded. We measured a 0.2% weight loss of lithium powder which was caused by the capacity of this powder to become air-borne.

Example 3

About 0.6 grams of the same lithium-silicon powder as used in Example 1 was transferred into a weighing bottle in a glove box filled with argon. Then the sealed weighing bottle was transferred to a fume hood in a lab with ambient air. The temperature was recorded as 25° C. and the relative humidity was recorded as 55.6%. The sample was exposed to the ambient air, and no burning was observed.

Example 4

Some of the same lithium silicon alloy powder as used in Example 1 was sprinkled onto a pre-made graphite anode (graphite:conductive additive:binder 88:5:7, loading 4.7 mg/cm2 and porosity 40%), then calendered with a rolling pin, the resultant anode was a graphite layer doped with LixSiy powder.

Example 5

A coin cell, identified as "cell #1", was assembled from the resultant anode from Example 4, with lithium foil as the counter electrode and 1M LiPF6 in 3/7 EC/EMC (ethylene carbonate/ethyl methyl carbonate) as the electrolyte. The open circuit voltage (OCV) of the cell was measured as about 0.46V. The cell rested at OCV for 12 hours then the lithiation process (Step 1) started at C/20 until the voltage reached 0.002V. The subsequent delithiation (Step 2) was also at C/20 until voltage reached 1.5V. The specific capacity as recorded is charted in FIG. 1 with a lithiation capacity of 412 mAh/g of graphite and delithiation capacity of 457 mAh/g of graphite.

As shown in this Example, the first cycle delithiation capacity was shown to be higher than lithiation capacity, which suggested this LixSiy powder from Example 1 can function as a prelithiation agent in a lithium-ion-battery.

Example 6

Figure 2:
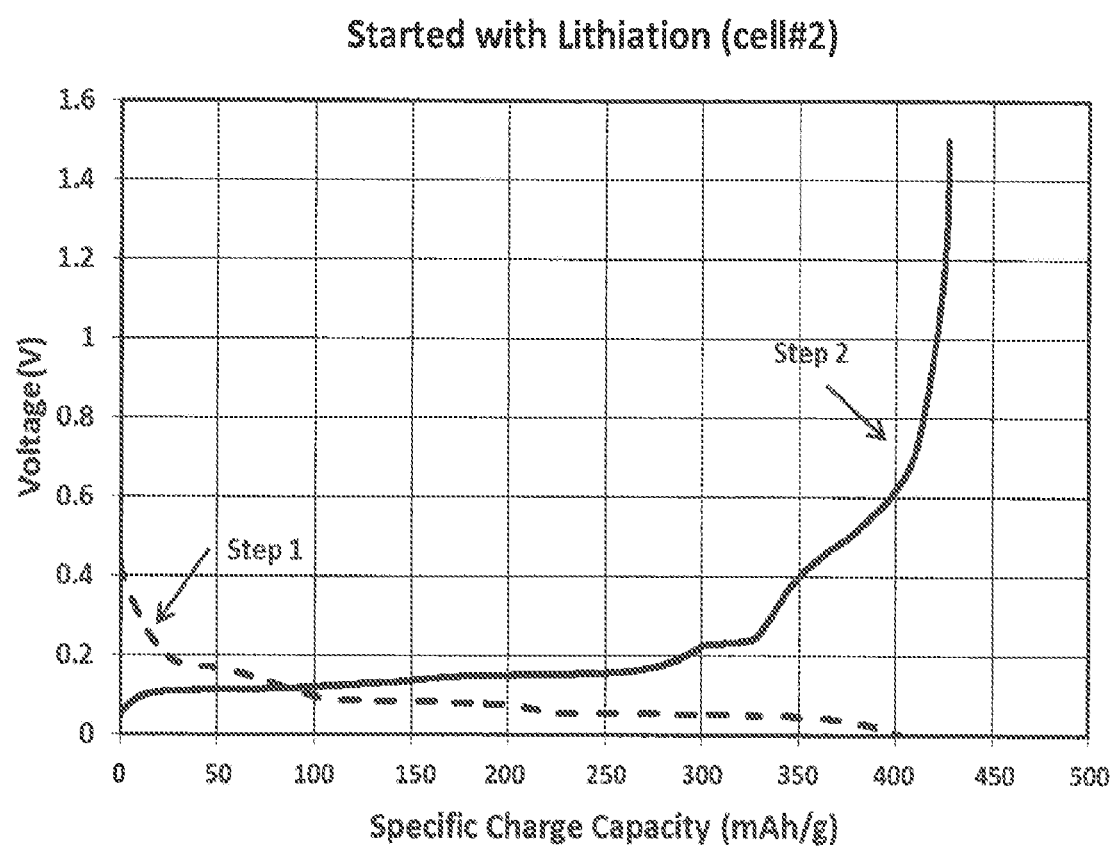
FIG. 2 illustrates the first cycle capacity of a coin cell identified as cell #2, which was prelithiated according to this invention.

A coin cell, identified as "cell #2" was also assembled from the resultant anode from Example 4 with lithium foil as the counter electrode and 1M LiPF6 in 3/7 EC/EMC as the electrolyte, and tested. Results are as shown in FIG. 2. The OCV of cell #2 was recorded as 0.47V, the lithiation capacity (see Step 1) was recorded as 402 mAh/g of graphite, and the delithiation capacity (see Step 2) was recorded as 428 mAh/g of graphite.

As shown in this Example, the first cycle delithiation capacity was shown to be higher than lithiation capacity, which suggested this LixSiy powder from Example 1 can function as a prelithiation agent in a lithium-ion-battery.

Example 7

Figure 3:
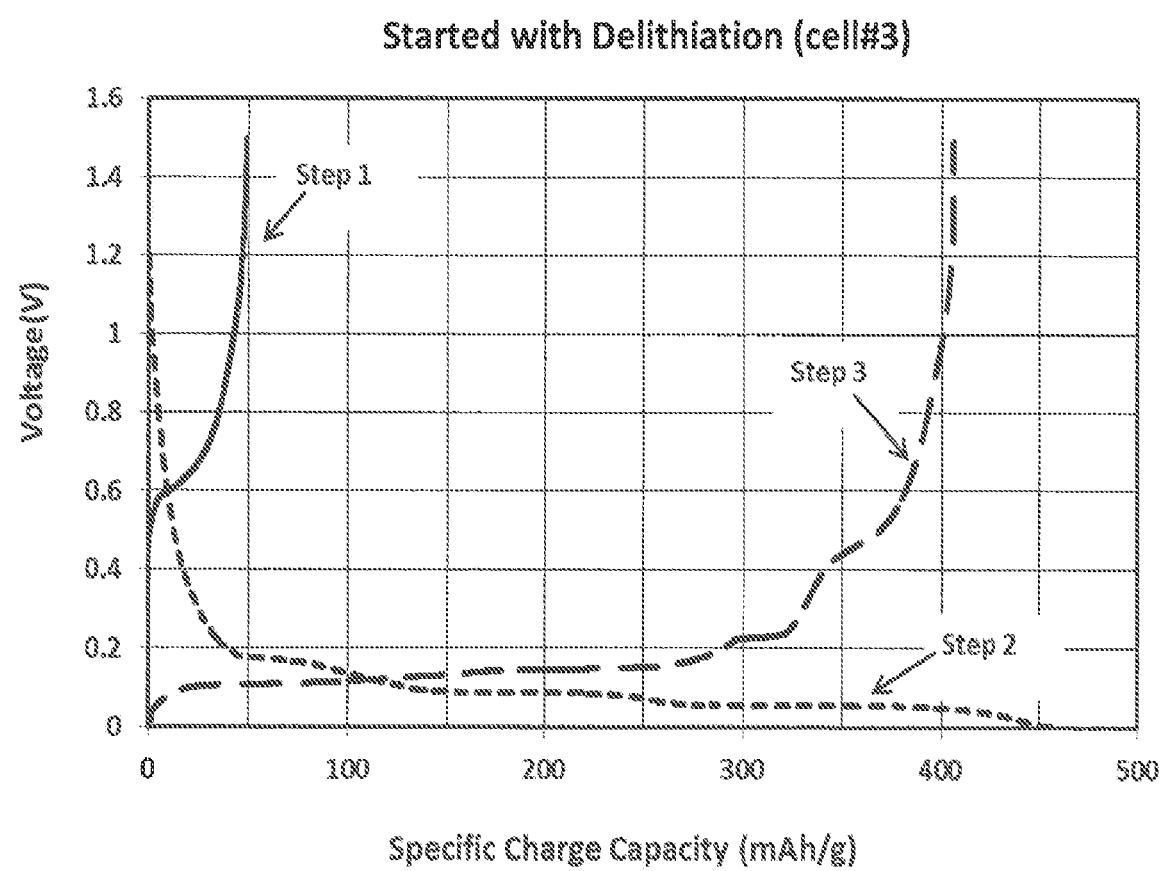
FIG. 3 illustrates the capacity of a coin cell identified as cell #3, which was prelithiated according to this invention.

A coin cell, identified as "cell #3", was assembled from the resultant anode from Example 4 with lithium foil as the counter electrode and 1M LiPF6 in 3/7 EC/EMC as the electrolyte. The open circuit voltage (OCV) of the cell was measured as about 0.47V. The cell rested at OCV for 12 hours then the delithiation process (Step 1) started at C/20 until the voltage reached 1.5 V. As shown in FIG. 3, this initial delithiation capacity was recorded as 48.9 mAh/g of graphite for cell #3. (By comparison, for a typical graphite anode without any prelithiation, as there is no lithium in it, its initial delithiation capacity would be close to zero if tested with an initial delithiation step.) As shown in FIG. 3, cell #3 was then lithiated at C/20 (Step 2) until the voltage reached 0.002V. The subsequent delithiation (Step 3) was also at C/20 until voltage reached 1.5V. The specific capacity as recorded is charted in FIG. 3 with a lithiation capacity of 450 mAh/g of graphite and delithiation capacity of 406 mAh/g of graphite.

As shown in this Example, the cell with a graphite layer doped with the LixSiy powder from Example 1 demonstrated 48.9 mAh/g delithiation capacity without any lithiation cycle, which confirmed this LixSiy powder can function as a prelithiation agent in a lithium-ion-battery.

Example 8

Figure 4:
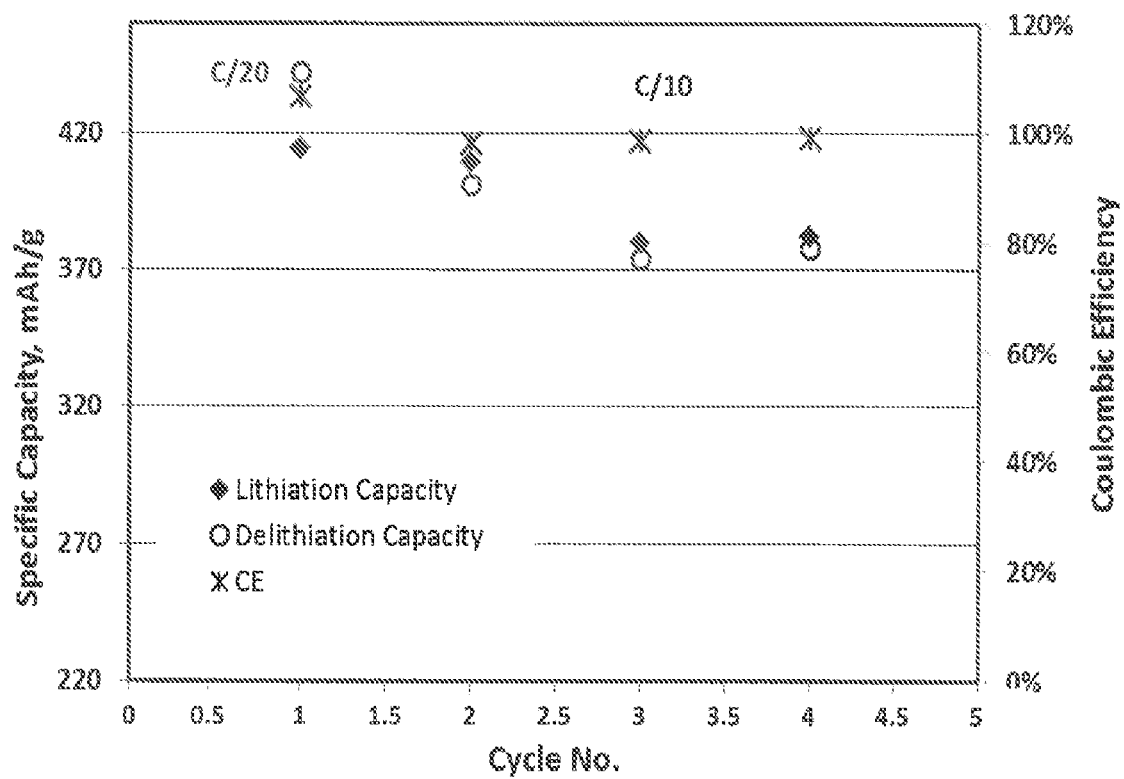
FIG. 4 is a graph that provides data about the coulumbic efficiency ("CE") of a coin cell prelithiated according to this invention.

The coin cell identified as cell #1 from Example 7 was cycled at C/10 for 3 more times after the initial C/20 cycle. The coulombic efficiency (CE) was calculated as per Equation 1 [CE=Delithiation Capacity/Lithiation Capacity*100%]. As shown in FIG. 4, the initial CE is higher than 100%, and the CE of the rest cycles is 99%.

Example 9

A lithium silicon alloy having a Li content of 44 wt % was ground by a centrifugal mill and sieved with US Standard sieves; and the powder less than 325 mesh was collected. The nominal sieve opening for a 325 mesh sieve is 44 microns. About 1 gram of the resultant powder was transferred into a weighing bottle in a glove box filled with argon and the weight gain in a dry room (dew point of −41.4° C.) was recorded as 0.7% after the first 7 hours.

Example 10 (a)

In a glove box filled with argon, 14.015 grams of lithium rod pieces and 11.022 grams of silicon chips were put into a tantalum crucible, for a target lithium silicon alloy with lithium content of 56.0 wt %. Then the crucible was put into an oven inside the glove box and heated up to 750° C., stirred, and heated for an additional 1 hour. The resulting alloy was poured into a cooling tray. Once cooled to room temperature, the alloy was crushed with a hammer then transferred to a ball mill. The material was ground in the ball mill using 10 mm stainless steel balls at 100 rpm, 300 rpm, and 400 rpm for various periods of time. The alloy pieces after grinding were not broken, but large, dented agglomerates, which suggested the material was too soft to be ground into powder.

Example 10 (b)

In a glove box filled with argon, 5.718 grams of lithium rod pieces and 19.245 grams of silicon chips were put into a tantalum crucible, for a target lithium silicon alloy with lithium content of 22.9 wt %. Then the crucible was put into an oven inside the glove box and heated up to 700° C., stirred, and heated for an additional 1 hour. The resulting alloy was poured into a cooling tray. Once cooled to room temperature, the alloy was crushed with a hammer then transferred to a ball mill. The material was ground in the ball mill using 3 mm stainless steel balls at 100 rpm for 1 hour then 300 rpm for 30 minutes. The resultant powder material was sieved with US Standard sieves; and the powder that passed a 325 mesh sieve was collected.

The actual lithium content of the resultant material was 22.3 wt % as tested by acid titration. XRD (X-ray Diffraction) confirmed that the resultant material comprises $Li_{12}Si_7$.

About 1 gram of the resultant powder was transferred into a weighing bottle in a glove box filled with argon and the weight gain in a dry room (dew point of −41.4° C.) was recorded as 0.7% after the first 7 hours.

Some of the sieved lithium silicon alloy powder was sprinkled onto a pre-made graphite anode (graphite:conductive additive:binder 88:5:7, loading 7.1 mg/cm2 and porosity 40%), then calendered with a spatula, the loading of the LixSiy powder was measured as about 1.05 mg/cm2.

Five coin cells were assembled from the resultant anode, with lithium foil as the counter electrode and 1M LiPF6 in 3/7 EC/EMC as the electrolyte. The open circuit voltage (OCV) of the cells was measured as about 0.597V to 0.634V. The cells rested at OCV for 12 hours then the delithiation process started at C/20 until the voltage reached 1.5 V. The average initial delithiation capacity was recorded as 37.8 mAh/g of graphite.

Example 11

A portion (15 grams) of the lithium silicon alloy powder from Example 9, with 44% lithium and having been sieved through the 325 mesh screen, was mixed in a glass flask under an argon atmosphere with 33.2 mL of a 2% LiBOB solution (LiBOB=lithium bis(oxalato)borate) in anhydrous PC/DMC (1:1 wt/wt; PC=propylene carbonate; DMC=dimethyl carbonate) and stirred for 2 hours at room temperature. The resulting suspension was filtered in the absence of air, dried under vacuum at room temperature, and again dried under vacuum after being heated to 200° C. After sieving through a 325 mesh screen, 12 grams of a grey powder was collected. A new exotherm could be observed in the DSC of the treated lithium silicon alloy that was not present in the untreated lithium silicon alloy.

About 1 gram of the resultant LiBOB treated powder was transferred into a weighing bottle in a glove box filled with argon and a negligible weight gain in a dry room (dew point of −42.6° C.) was recorded (−0.06 wt %) after the first 7 hours.

Some of the sieved LiBOB treated lithium silicon alloy powder was sprinkled onto a pre-made graphite anode (graphite:conductive additive:binder 88:5:7, loading 7.1 mg/cm$^2$ and porosity 40%), then calendered with a spatula, the loading of the lithium silicon powder was measured as about 1.05 mg/cm$^2$.

Five coin cells were assembled from the resultant anode, with lithium foil as the counter electrode and 1M LiPF6 in 3/7 EC/EMC as the electrolyte. The open circuit voltage (OCV) of the cells was measured as about 0.460 V to 0.467 V. The cells rested at OCV for 12 hours then the delithiation process started at C/20 until the voltage reached 1.5 V. The average initial delithiation capacity was recorded as 64.1 mAh/g of graphite.

Example 12

A lithium silicon alloy having a Li content of 44 wt % was ground by a centrifugal mill and sieved with US Standard sieves; and the powder less than 325 mesh was collected. The nominal sieve opening for 325 mesh sieve is 45 microns. About 10 grams of the resultant powder was transferred into a stainless steel crucible. A 4% by weight solution of polyisobutylene (PIB; average molecular weight ~1,000,000) in hexane was added until all the powder was wetted. About 6 grams of the PIB in hexane solution was used. The alloy and polymer solution was stirred until homogenous. The crucible was then put in an oven, in an argon glove box, and heated up to 600° C. The oven was held at 600° C. for three hours then the crucible was removed and allowed to cool to room temperature.

About 1 gram of the resultant powder was transferred into a weighing bottle in a glove box filled with argon and the weight gain in a dry room (dew point of −42.6° C.) was recorded as 0.5% after the first 8 hours. XRD (X-ray Diffraction) confirmed that the resultant material comprised Li12Si7, and the carbon content in the resultant material was about 0.14%, as measured by TOC (Total Organic Carbon) analyzer.

Example 13

A portion (5.0 grams) of the lithium silicon alloy powder from Example 9, with 44% lithium and particles having been sieved through the 325 mesh screen, was made into a slurry in a dry room with the below formulation:
97% lithium silicon alloy powder
2% PIB binder
1% conductive additive
Hexane as solvent
Solid content of about 37.5%

A pre-made graphite anode (graphite:conductive additive: binder 88:5:7, loading 7.1 mg/cm2 and porosity 40%) was contacted with the resultant slurry using a doctor blade on a slip table. After air drying, the resulting anode included graphite with a surface layer containing 97% lithium silicon alloy.

Five coin cells were assembled from the air dried anode, with lithium foil as the counter electrode and 1M LiPF6 in 3/7 EC/EMC as the electrolyte. The open circuit voltage (OCV) of the cells was measured as about 0.4V. The cells rested at OCV for 12 hours then the delithiation process started at C/20 until the voltage reached 1.5 V. The average initial delithiation capacity was recorded as 90 mAh/g of graphite.

Example 14

A portion (5.0 grams) of the lithium silicon alloy powder from Example 9, with 44% lithium and particles having been sieved through the 325 mesh screen, was made into a slurry in a dry room with the below formulation:
97% lithium silicon alloy powder
2% PVDF (Polyvinylidene(di)fluoride) binder
1% conductive additive
Hexane as solvent
Solid content of about 43.4%

A pre-made graphite anode (graphite:conductive additive: binder 88:5:7, loading 7.1 mg/cm2 and porosity 40%) was contacted with the resultant slurry using a doctor blade on a slip table then dried in a vacuum oven at 50° C. for 20 minutes. The resulting anode included graphite with a surface layer containing 97% lithium silicon alloy.

Two coin cells were assembled from the oven-dried anode, with lithium foil as the counter electrode and 1M LiPF6 in 3/7 EC/EMC as the electrolyte. The open circuit voltage (OCV) of the cells was measured as about 0.470V.

ADVANTAGES

This invention is advantageous in that certain Li alloys are more stable than Li itself. For instance, a LixSiy alloy powder with a Li content of about 10 to 90 wt % is stable in a dry room for more than 24 hours, and fairly stable in humid air; and compared to Li itself, is much easier to handle, which makes the application and dosing process much easier, when applied to an electrode.

While the present invention has been described in terms of one or more preferred embodiments, it is to be understood that other modifications may be made without departing from the scope of the invention, which is set forth in the claims below.

What is claimed is:

1. A method for prelithiating an electrode in a single step, which electrode is a pre-made electrode and is comprised of a current collector and an active material layer disposed thereon, the active material layer forming a surface of the electrode, said method comprising contacting the electrode with a plurality of particles of one or more $Li_xSi_y$ alloys by scattering the plurality of particles on a surface of the electrode, the plurality of particles being in powder form substantially in the absence of a solvent and applied in a single step,
wherein at least about 95 vol % of the particles range in size from about 1 micrometer to about 70 micrometers, and each of the $Li_xSi_y$ alloys comprises lithium having a content in the range of about 15 wt % to about 60 wt %, wherein the contacting of the electrode is conducted on the surface of the electrode,
and wherein the active material is selected from the group consisting of graphite, silicon, silicon oxide(s), and graphite with silicon and/or silicon oxide(s).

2. The method of claim 1, wherein at least one of the $Li_xSi_y$ alloys has a lithium content in the range of about 40 wt % to about 50 wt %.

3. The method of claim 1, wherein at least about 95 vol % of the particles range in size from about 1 micrometer to about 50 micrometers.

4. The method of claim 1, wherein at least about 97 vol % of the particles range in size from about 1 micrometer to about 70 micrometers.

5. The method of claim 1, wherein at least one of the $Li_xSi_y$ alloys has been contacted with an organic substance.

6. The method of claim 1, wherein at least one of the $Li_xSi_y$ alloy has been contacted with an inorganic substance.

7. The method of claim 1, wherein the electrode is a graphite-based electrode or a silicon-based electrode.

8. The method of claim 1, wherein at least one of the $Li_xSi_y$ alloys has been contacted with an organic substance, wherein the organic substance comprises boron.

9. The method of claim 1, wherein at least one of the $Li_xSi_y$ alloys has been contacted with an organic substance, wherein the organic substance comprises boron and oxygen.

10. The method of claim 1, wherein at least one of the $Li_xSi_y$ alloys has been contacted with an organic substance, wherein the organic substance comprises lithium bis(oxalate)borate.

11. The method of claim 1, further comprises grinding the one or more $Li_xSi_y$ alloys into resulting particles and sieving the resulting particles so as to form the plurality of particles in powder form.

* * * * *